United States Patent
Spears

(10) Patent No.: US 6,894,812 B1
(45) Date of Patent: May 17, 2005

(54) PHOTOSENSOR ASSEMBLY WITH SHARED STRUCTURES

(75) Inventor: Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 974 days.

(21) Appl. No.: 09/703,960

(22) Filed: Oct. 31, 2000

(51) Int. Cl.[7] .............................................. H04N 1/04
(52) U.S. Cl. ....................... 358/483; 348/294; 348/302
(58) Field of Search .................. 358/483; 348/294, 348/302, 303, 304, 311, 314, 315, 316

(56) References Cited

U.S. PATENT DOCUMENTS

| | | | |
|---|---|---|---|
| 4,543,489 A | 9/1985 | Harada et al. ............... 250/578 |
| 4,554,585 A | 11/1985 | Carlson ....................... 358/209 |
| 4,805,006 A | 2/1989 | Yamaguchi et al. .......... 357/30 |
| 5,020,118 A | 5/1991 | Sugiura ........................ 382/50 |
| 5,055,921 A | 10/1991 | Usui ............................ 358/44 |
| 5,075,770 A | 12/1991 | Smyth ......................... 358/80 |
| 5,151,588 A | 9/1992 | Kiri et al. .................... 250/208.1 |
| 5,233,428 A | * 8/1993 | Alford et al. ............... 348/230.1 |
| 5,262,871 A | 11/1993 | Wilder et al. .......... 358/213.11 |
| 5,267,335 A | * 11/1993 | Mita .......................... 382/318 |
| 5,345,319 A | * 9/1994 | Yu ............................. 358/483 |
| 5,489,940 A | 2/1996 | Richardson et al. ........ 348/315 |
| 5,751,032 A | * 5/1998 | Yu ............................. 257/233 |
| 5,784,101 A | 7/1998 | Hasegawa ................... 358/209 |
| 5,796,095 A | 8/1998 | Matsuyama et al. ...... 250/208.1 |
| 5,896,173 A | 4/1999 | Hassler ........................ 348/162 |
| 5,926,218 A | 7/1999 | Smith .......................... 348/358 |
| 5,949,061 A | 9/1999 | Guidash et al. .......... 250/208.1 |
| 5,949,483 A | 9/1999 | Fossum et al. .............. 348/303 |
| 5,969,830 A | * 10/1999 | Kimura ....................... 358/483 |
| 5,973,311 A | 10/1999 | Sauer et al. ............. 250/208.1 |
| 6,009,214 A | 12/1999 | Suggs ......................... 382/312 |
| 6,034,366 A | * 3/2000 | Yu ........................... 250/208.1 |
| 6,040,202 A | * 3/2000 | Yu .............................. 438/70 |
| 6,137,100 A | 10/2000 | Fossum et al. .......... 250/208.1 |
| 6,166,831 A | 12/2000 | Boyd et al. ................. 358/483 |
| 6,320,618 B1 | 11/2001 | Aoyama ..................... 348/335 |

* cited by examiner

*Primary Examiner*—Kimberly Williams
*Assistant Examiner*—Negussie Worku
(74) *Attorney, Agent, or Firm*—Augustus W. Winfield

(57) ABSTRACT

A photosensor assembly has at least one line array of photosensors with a first sensor size, and at least one line array of photosensors with a second sensor size, with the two sizes being different. In an example embodiment, for every band of wavelengths being sensed, there are two line arrays of sensors, with one line array having relatively small sensor areas and the other line array having relatively large sensor areas. The line arrays with relatively small sensor areas are used for high native input sampling rates, and the line arrays with relatively large sensor areas are used for high color accuracy and speed. To minimize cost and circuit area, each line array of sensors having large sensor areas shares a charge shift register with a line array of sensors having small sensor areas. If overflow drains are present, some pairs of sensor line arrays may also share overflow drains.

8 Claims, 7 Drawing Sheets

PHOTOSENSOR ASSEMBLY WITH SHARED STRUCTURES

FIELD OF INVENTION

This invention relates generally to photosensor arrays used for optical image scanners and cameras and more specifically to line arrays commonly used for optical image scanners.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

Common photosensor technologies include Charge Coupled Devices (CCD), Charge Injection Devices (CID), Complementary-Metal-Oxide (CMOS) devices, and solar cells. Typically, for a CID or a CMOS array, each photosensitive element is addressable. In contrast, CCD line arrays commonly serially transfer all the charges, bucket-brigade style, from each line array of photosensitive elements to a small number of sense nodes for conversion of charge into a measurable voltage. The present patent document is primarily concerned with photosensor arrays having serial charge transfer registers, also called serial readout registers.

In general, there is an ongoing demand for increased resolution and speed, improved color quality and image quality, and reduced cost, demands that often directly conflict and require trade-offs. The following background presents some of the factors affecting resolution, speed, color quality, image quality and cost.

In general, image scanners use an optical lens system to focus an image onto an array of photosensors. Photosensor arrays typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch (or mm) as measured on the document (or object, or transparency) being scanned. Optical sampling rate as measured on the document being scanned is also called the input sampling rate.

Photosensor assemblies for image scanners commonly have three or four line arrays of sensors, with each line array receiving a different band of wavelengths of light, for example, red, green and blue. Each line array may be filtered, or white light may be separated into different bands of wavelengths by a beam splitter. Typically, the pitch (spacing of individual photosensor elements) is the same for each line array, and typically the pitch is set to provide a specified native input sampling rate.

The native input sampling rate is determined by the optics and the pitch of the individual sensors. A scanner operator may select a sampling rate that is less than the native input sampling rate by simply dropping selected pixels, or by using digital resampling techniques. Alternatively, a scanner operator may select a sampling rate that is greater than the native input sampling rate, where intermediate values are computed by interpolation. Typically, all the charges or voltages are read from the photosensor array, and are then digitized, and then subsampling or interpolation is performed on the resulting digital pixel data.

Bit depth is the number of bits captured per pixel. Typically, a pixel is specified in a three-dimensional color space with a fixed number of bits in each dimension. For example, a pixel may be specified in red, green, blue (RGB) color space, with 8 bits of red information, 8 bits of green information, and 8 bits of blue information, for a total of 24 bits per pixel. Alternatively, a pixel may be specified in a cylindrical color space in which the dimensions are luminance, chrominance, and saturation. Alternatively, a three-dimensional CIE color space may be used, for example, CIELAB or CIELUV, where one dimension is luminance. In this application, "high" bit depth means that all bits are accurate, distinguishing accuracy from simple resolution. That is, a scanner could provide many bits of information, but have a noise level that makes most of the lower order bits meaningless.

Even if a sensor is receiving no light, some thermal noise (called dark noise) may occur. Thermal noise (dark noise) is proportional to time. During exposure to light, the primary noise source (called shot noise) is related to conversion of photons to electrons, and the noise increases with the square root of the signal. Small sensors tend to have a lower signal-to-noise ratio than large sensors, particularly for low reflectance or low transmissivity areas of a document. Smaller sensor areas can provide higher input sampling rates, but other measures of image quality, and in particular color quality, as measured by signal-to-noise, may be reduced.

If an input sampling rate is selected that is lower than the native input sampling rate, then the signal-to-noise may be improved by averaging samples. Analog signals from adjacent sensor areas may be added, or digital values may be averaged after analog-to-digital conversion. Adding N samples improves the signal-to-noise ratio by the square root of N. Typically, adding analog signals requires the signal levels to be relatively small before adding to avoid saturating a charge element, so that analog averaging is typically used for speed (fewer conversions) rather than for improvement in signal-to-noise ratio.

Scanning speed is affected by multiple factors: exposure time, shift time of registers multiplied by number of pixels being shifted, output amplifier speed, and analog-to-digital conversion time. Typically, for low native input sampling rates, the primary limiter is exposure time, that is, the time required to generate a signal that provides an acceptable signal-to-noise ratio. However, if the number of pixels being shifted and converted becomes very large, then the time required to shift and convert the individual pixel signals may become the limiting factor.

Areas of an image with slowly varying color, particularly dark colors, require high bit depth and high signal-to-noise to accurately reproduce the smooth tone and texture of the original. For areas of slowly varying color, high input sampling rate is not needed because there is no high frequency information in the image. Areas of an image that change color rapidly, for example a forest scene, or a close-up photograph of a multi-colored fabric, need a high input sampling rate to capture the high frequency information, but high bit depth and high signal-to-noise are not needed. That is, for high frequency information, the color accuracy of each individual pixel is less important. High input sampling rates require small sensor areas, which in turn have relatively low signal-to-noise ratios, relatively low bit depth, and relatively low scanning speed. Large sensor areas provide high signal-to-noise, high bit depth, and high speed, but cannot provide high input sampling rates.

There is a need for a scanner that provides high speed, and high color quality, and high native input sampling rate, with minimal increase in cost.

SUMMARY OF THE INVENTION

A photosensor assembly has at least one line array of photosensors with a first sensor size, and at least one line array of photosensors with a second sensor size, with the two sizes being different. In the example embodiments, for every band of wavelengths being sensed, there are two line arrays of sensors, with one line array having relatively small sensor areas and the other line array having relatively large sensor areas. The line arrays with relatively small sensor areas are used for high native input sampling rates, and the line arrays with relatively large sensor areas are used for high color accuracy and speed. To minimize cost and circuit area, each line array of sensors having large sensor areas shares a charge shift register with a line array of sensors having small sensor areas. If lateral overflow drains are present, some pairs of sensor line arrays may also share overflow drains.

DETAILED DESCRIPTION OF THE PREFERRED EMBODIMENT OF THE INVENTION

Figure 1:
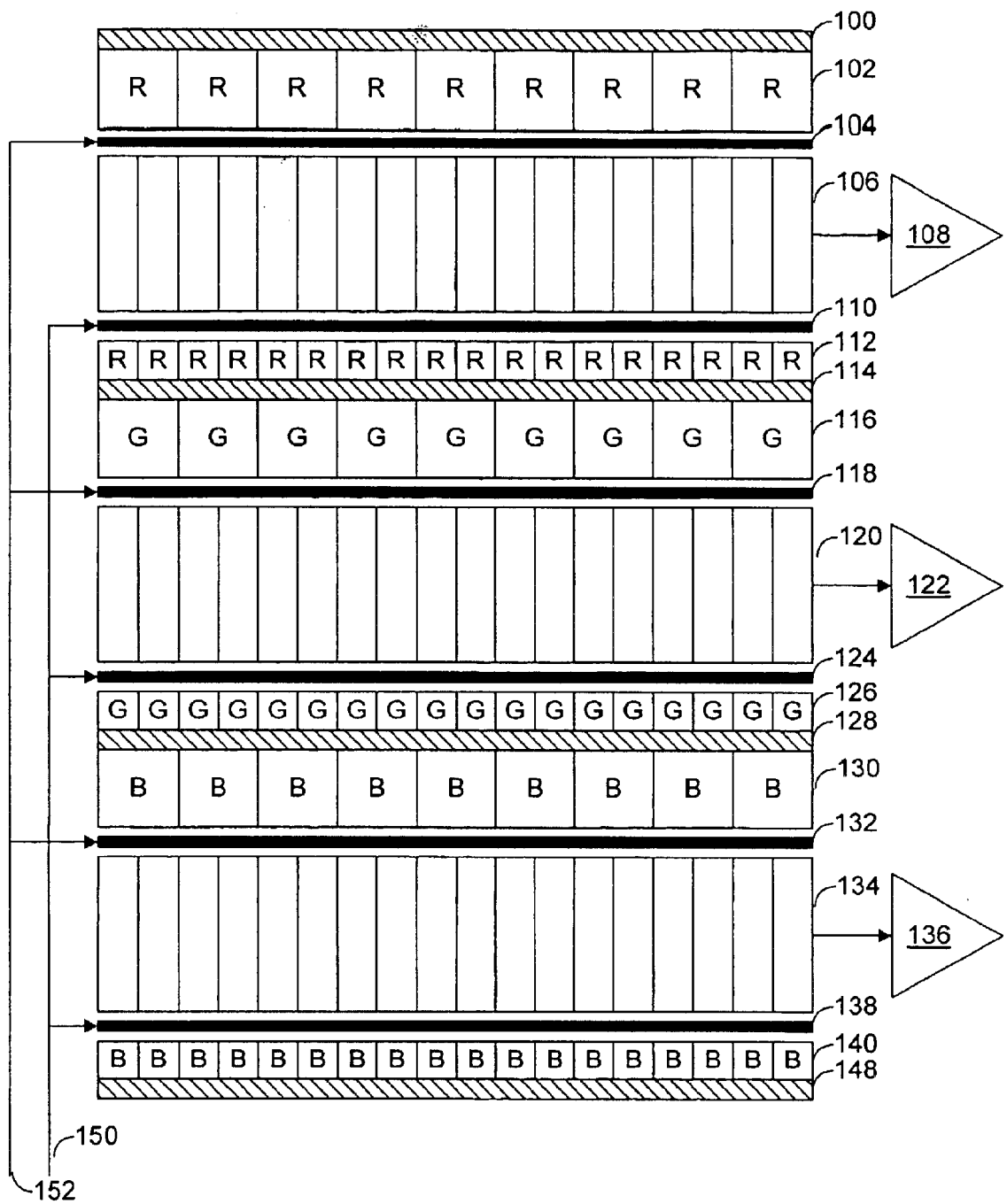
FIG. 1 is a block diagram of a first example embodiment of a photosensor assembly in accordance with the invention.

FIG. 1 illustrates a photosensor assembly having pairs of line arrays of photosensors for sensing three color bands. In FIG. 1, photosensor line arrays 102 and 112 sense red light, photosensor line arrays 116 and 126 sense green light, and photosensor line arrays 130 and 140 sense blue light. The number of photosensor line arrays, the choice of colors, and the arrangement of the colors is for illustration only. For example, an array in accordance with the invention may sense yellow, magenta, and cyan light. Alternatively, at least one photosensor line array may sense white light. Alternatively, a line array of photosensors may sense different colors with different photosensors; for example, the first photosensor in the line array may sense red light, the second photosensor in the line array may sense green light, the third photosensor in the line array may sense blue light, with the sequence repeating for thousands of photosensors in the line array. There may be fewer than six line arrays of photosensors, or there may be more than six line arrays. The line arrays may curve, for example, to compensate for distortion in an optical system. Note that filter transmissivity or beam splitting efficiency may vary from color to color. Therefore, the exposure time may be different for each photosensor line array to enable each sensor to generate sufficient electrons to provide a specified signal level at a specified maximum illumination intensity on the document being scanned.

Photosensors in line arrays 102, 116, and 130 have relatively large areas. Photosensors in line arrays 112, 126, and 140 have relatively small areas. The line arrays with relatively small sensor areas are used for high native input sampling rates, and the line arrays with relatively large sensor areas are used for high color accuracy and speed. Relatively to the small sensors, the large sensor areas provide relatively better signal-to-noise but at a relatively lower native input sampling rate. Conversely, the smaller sensor areas provide a relatively high native input sampling rate, but with reduced signal-to-noise.

As discussed above, for CCD arrays, it is common to transfer charges to a charge shift register and serially shift the charges to a few sense nodes for analog-to-digital conversion. Accordingly, in FIG. 1, there are three charge shift registers (106, 120, and 134). Register 106 shifts charges to amplifier 108, register 120 shifts charges to amplifier 122, and register 134 shifts charges to amplifier 136. Transfer gates (104, 110, 118, 124, 132, and 138) control transfer of charge from the photosensor areas to the charge shift registers. For example, transfer gate 104 controls transfer of charges from photosensors 102 to charge shift register 106. Control line 150 controls transfer of charges from the small sensor areas to the charge shift registers, and control line 152 controls transfer of charges from the large sensor areas to the charge shift registers. Note that six control lines may be required if independent exposure times are required for each sensor array.

In accordance with the invention, charge shift registers are shared. In the example embodiment illustrated in FIG. 1, each line array of large area photosensors shares a charge shift register with a line array of small area photosensors for the same color. For example, charge shift register 106 is shared by the large red photosensors 102 and the small red photosensors 112. The dominant cost of an integrated circuit is the die area on a wafer. For CCD arrays, the charge shift registers and associated amplifiers are relatively large structures. By sharing charge shift registers and amplifiers, as illustrated in FIG. 1, additional line arrays of photosensors may be added for very little incremental cost, or more assemblies can be fabricated on a single wafer.

In the example configuration of FIG. 1, note that the configuration of the control lines 150 and 152 assumes that one wants to use either the large photosensor line arrays, or the small photosensor line arrays, but not both large and small line arrays simultaneously. However, in general, in may be desirable to scan using large sensors for some colors and small sensors for other colors. For example, one may want to scan white light using small sensor areas, and red/green/blue light using large sensor areas. This provides a high input sampling rate at a relatively low signal-to-noise ratio for luminance, which carries most of the high frequency information, and a high signal-to-noise at a lower sampling rate for color, where bit depth is important. However, large white sensors may also be desired for fast black and white scans, facsimile, or copy modes. Therefore, in general, one may scan using line arrays of photosensors having a mixture of photosensor sizes.

Note in the example embodiment illustrated in FIG. 1 that the number of stages in each charge shift register is at least as great as the number of photosensor areas in a line array of small photosensors. For example, the number of stages in shift register 106 is at least as great as the number of photosensors in line array 112. In FIG. 1, each small photosensor area transfers charge into one charge shift register stage, and each large photosensor area transfers charge into two charge shift register stages. When scanning with the large photosensor areas, the charges from pairs of charge shift register stages are added before conversion. There are many suitable variations, and in particular, the number of stages in the charge shift registers may be greater than the number of associated photosensors, and shift register stages may be interlaced.

With intense light or long exposures, photosensor charge wells may saturate, and excess charge may spill over into adjacent photosensor charge wells, resulting in blooming (resulting bright areas in the digitized image are larger than the actual bright areas). In CCD arrays, it is common to provide overflow drains (also called antibloom drains) to bleed off any excess charges to prevent blooming. Barrier heights of overflow drains may be controlled by an external voltage to provide variable integration times. Overflow drains may be fabricated below the charge wells (called a vertical overflow drain) or adjacent to photodetectors (called a lateral overflow drain). Lateral overflow drains take up die area on the semiconductor substrate. In FIG. 1, areas 100, 114, 128, and 148 represent lateral overflow drains. Note that photosensor line arrays 112 and 116 share overflow drain 114, and line arrays 126 and 130 share overflow drain 128.

Figure 2A:
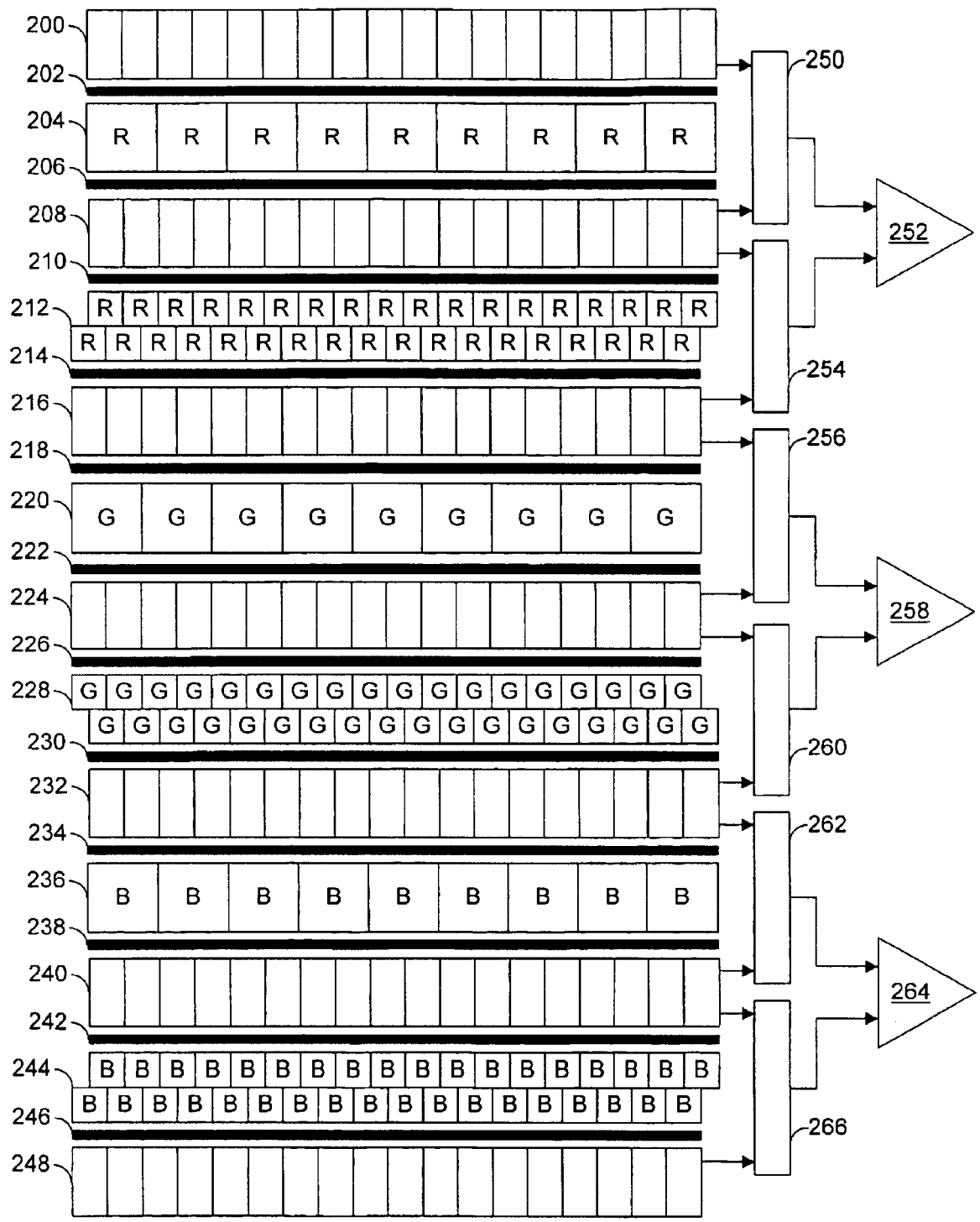
FIG. 2A is a block diagram of a second example embodiment of a photosensor assembly in accordance with the invention.
Figure 2B:
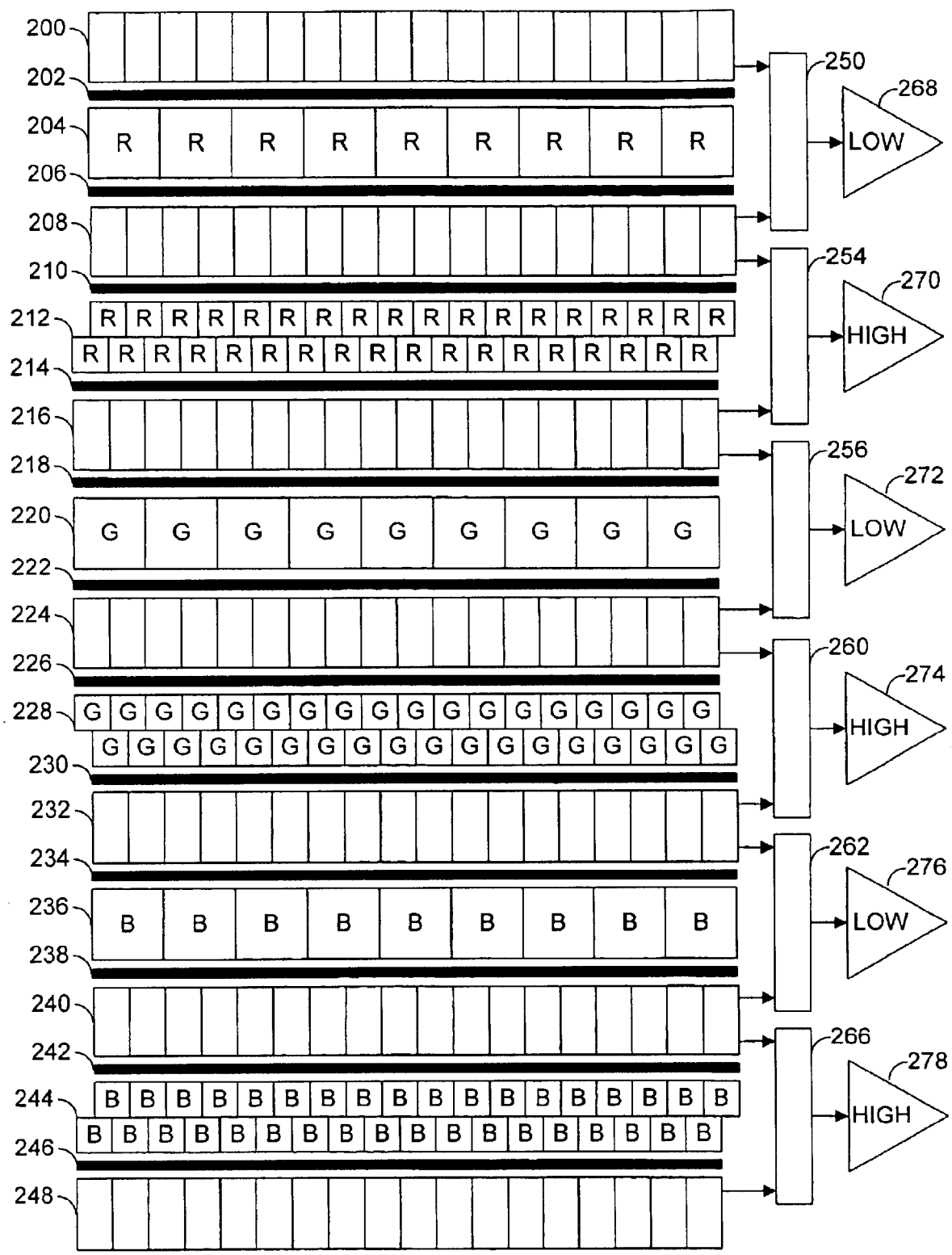
FIG. 2B is a block diagram of the example embodiment of FIG. 2A, with integrated amplifiers having different gains.

Photosensors in FIG. 1, for example line array 112, are illustrated with no space between adjacent photosensors. In actual CCD architectures, space is required between adjacent photosensors to provide charge blocking and other essential integrated circuit structures. As charge wells decrease in size, the spacing between charge wells becomes a larger fraction of the CCD area, reducing the signal-to-noise ratio (because light gathering capacity is reduced) and perhaps reducing the effective modulation transfer function (ability to capture high frequency information). It is known to stagger CCD photosensors (alternate photosensor elements are offset in opposite directions from a centerline) to partially compensate for the area loss between adjacent photosensors. Staggered photosensors typically require dual-sided charge shift registers (one charge shift register on each side of the staggered line array). In conventional CCD architecture, if three line arrays of large photosensors and three staggered line arrays of small photosensors were fabricated as one assembly, then three charge shift registers would be required for the three line arrays of large photosensors, and an additional six charge shift registers would be required for the three staggered line arrays of small photosensors. FIGS. 2A and 2B illustrate an example embodiment in accordance with the invention, with three line arrays of photosensors and three staggered line arrays of photosensors (hereinafter staggered line arrays), in which charge shift register sharing reduces the number of charge shift registers from nine (as required in conventional CCD architecture) to seven.

In FIG. 2A, there are three line arrays of large photosensors (204, 220, and 236) and three staggered line arrays of small photosensors (212, 228, 244). There are seven charge shift registers (200, 208, 216, 224, 232, 240, 248). There are twelve charge transfer gates (202, 206, 210, 214, 218, 222, 226, 230, 234, 238, 242, 246). Five of the seven charge shift registers (208, 216, 224, 232, and 240) are shared by pairs of line arrays of photosensors.

Note that the photosensor areas in the staggered line arrays of photosensors (212, 228 and 244) are illustrated as overlapping. That is, a vertical line through FIG. 2A might intersect two photosensors in staggered line array 212. The staggered photosensors may also be made smaller and staggered like a checkerboard, so that there is no overlap (so that a vertical line through FIG. 2A would intersect only one photosensor in staggered line array 212).

In the configuration illustrated in FIG. 2A, sets of three charge shift registers share one amplifier, where the three charge shift registers are all associated with one color. For any one exposure, for each color, only two of the three charge shift registers are used. For example, for large photosensor line array 204, registers 200 and 208 are used, and for staggered line array 212, registers 208 and 216 are used. Charge transfer registers (250, 254, 256, 260, 262, 266) control transfer of charges from two charge shift registers to one amplifier. The charge transfer registers may add charges, they may transfer charges unmodified, and they may also multiplex the two inputs and alternately transfer charges to an amplifier. For the large photosensors, charges are split between two charge shift registers. For example, charges from photosensor line array 204, are divided among charge shift registers 200 and 208 (charge from one photosensor flows to four charge shift register stages, two stages in register 200 and two stages in register 208), and are then recombined (added) by charge transfer register 250 before being transferred to amplifier 252. For the staggered small photosensors, charges transfer from one photosensor to one charge shift register stage. For example, charges from staggered line array 212 are transferred to charge shift registers 208 and 216 (charge from one photosensor flows to one shift register stage). Charge transfer register 254 may, for example, add multiple charges (if a lower resolution is requested that cannot be better satisfied by large sensor line array 204), or charge transfer register 254 may multiplex charges from shift registers 208 and 216 and alternately transfer the charges to amplifier 252.

High signal-to-noise requires exposure times that result in some photosensors reaching charge levels that approach saturation limits. However, not all scanning applications require high signal-to-noise. For example, the acceptable signal-to-noise for scanning for black-and-white copying, scanning for optical character recognition, and scanning for facsimile, may be relatively low compared to the signal-to-noise required for scanning color photographs. If high signal-to-noise is not needed, exposure times can be reduced, and scanning speed can be increased. Reduced exposure times results in smaller voltages to the analog-to-digital converter(s). It is known to have a variable-gain external amplifier to maintain full-range input signal voltage levels to the analog-to-digital converter(s). FIG. 2B illustrates an alternative example embodiment, with integrated amplifiers having different gains, enabling an alternative high-speed scanning mode for the shared register configuration of FIG. 2A.

In FIG. 2A, note that four charge shift register stages are used to store charge from one large photosensor area, and that one charge shift register stage is used to store charge from one small photosensor area. Accordingly, full saturation signals from the large photosensors are about four times the amplitude of full saturation signals from the small photosensors. Accordingly, amplification of the signals from the small photosensors should be about four times the amplification of the signals from the large photosensors, to maintain a full range signal input to the analog-to-digital converter(s). In FIG. 2B, amplifiers 268, 272, and 276 amplify signals from the large photosensors, and are labeled as having a relatively low gain. Amplifiers 270, 274, and 278 amplify signals from the small photosensors, and are labeled as having a relatively high gain.

With different amplifier gains, as illustrated in FIG. 2B, the configuration of FIG. 2B can be used for high-speed low-resolution scanning (with lower signal-to-noise) while maintaining a full range signal input to the analog-to-digital converter(s). For high-speed, the exposure time for the large photosensors can be reduced by one-fourth, and the large photosensors can then transfer charge to one (or two) charge shift register stages. For example, the exposure time for photosensors 204 can be reduced, and the charges can be transferred to charge shift register 208, without using charge shift register 200. Each large photosensor 208 can transfer its charge to one stage in charge shift register 208, or to two stages. If one stage is used (assumes that charge transfer gates have split controls), then charge transfer register 254 sends charge from every other charge shift register stage to amplifier 270. If two stages are used, then charge transfer register 254 adds charges from pairs of stages before transferring charges to amplifier 270. Amplifier 270 then provides a relatively high gain for the relatively low signal levels.

Figure 3A:
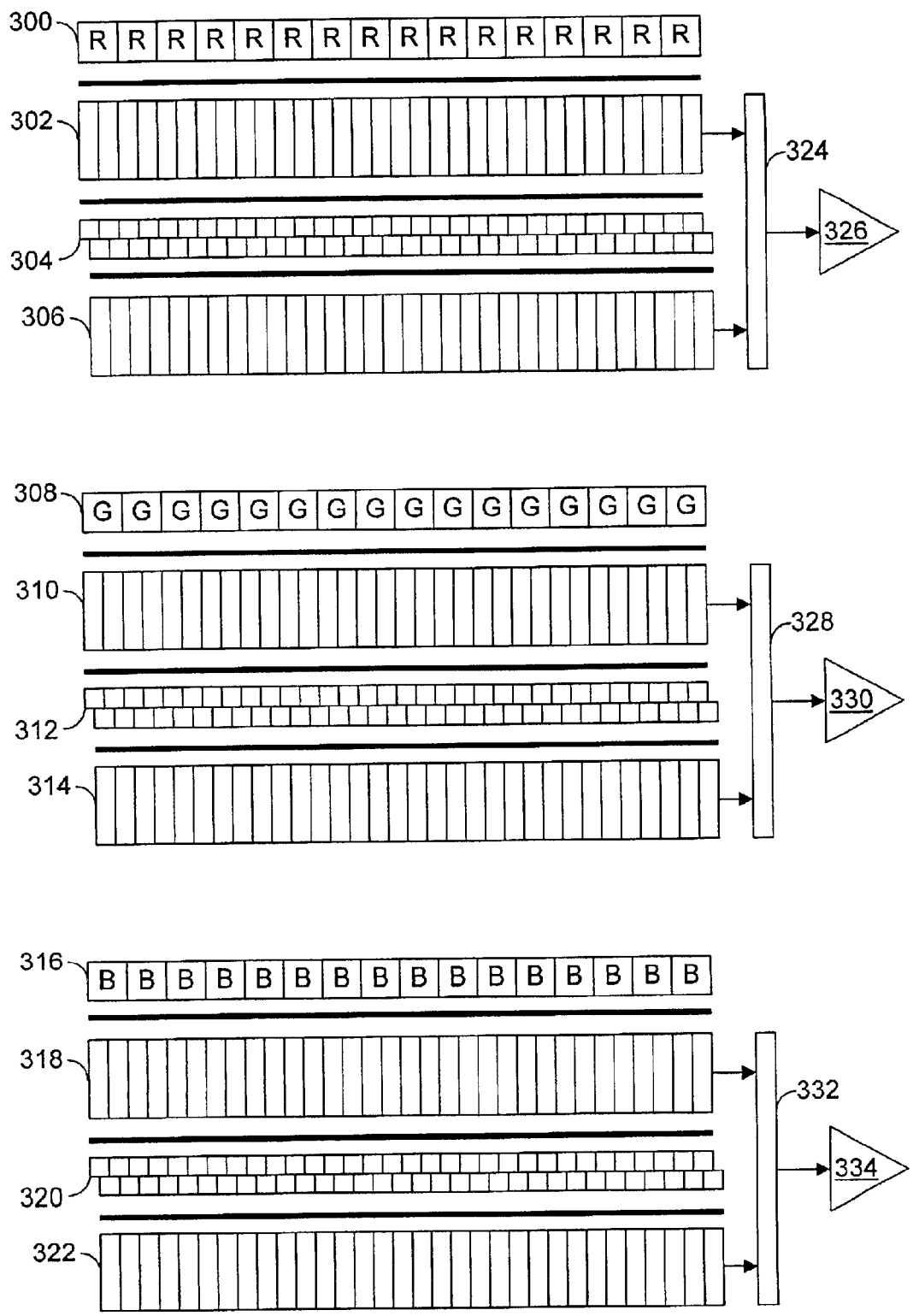
FIG. 3A is a block diagram of a third example embodiment of a photosensor assembly in accordance with the invention.
Figure 3B:
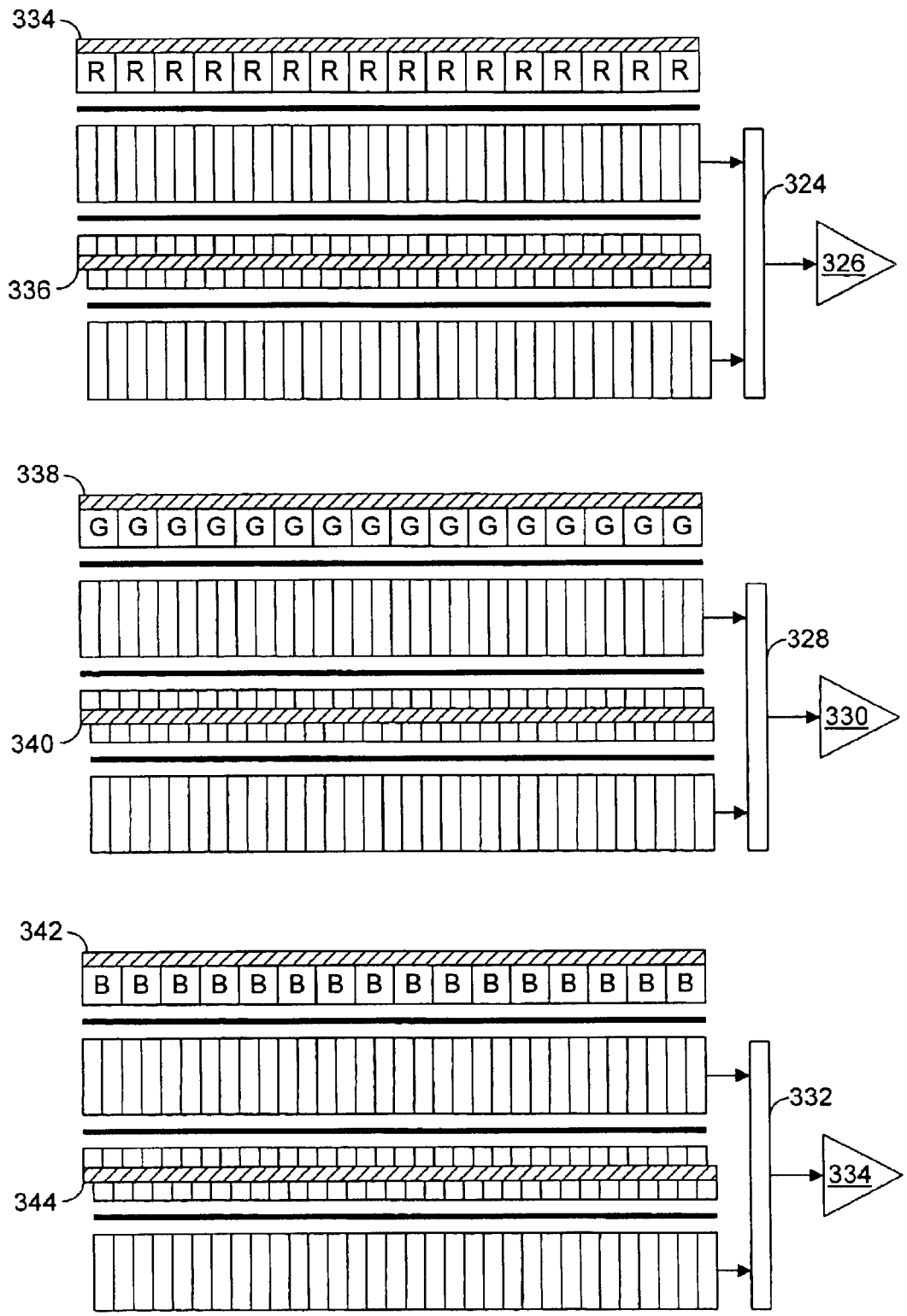
FIG. 3B is a block diagram of the example embodiment of FIG. 3A with the addition of overflow drains.

FIGS. 3A and 3B illustrate an alternative example embodiment, with staggered line arrays, with a simplified structure relative to the embodiments of FIGS. 2A and 2B, but perhaps with a lower signal-to-noise relative to the embodiments of FIGS. 2A and 2B. There are three line arrays of large photosensors (300, 308, and 316), and three staggered line arrays of small photosensors (304, 312, and 320). In FIGS. 3A and 3B, only six charge transfer registers (302, 306, 310, 314, 318 and 322) are required, even though there are three line arrays of large photosensors and three staggered line arrays of small photosensors. Each line array of large photosensors transfers charges to a single charge shift register (line array 300 to register 302, line array 308 to register 310, and line array 316 to register 318), which is shared with a staggered line array of photosensors. Each staggered line array transfers charges to two charge shift registers (staggered line array 304 to registers 302 and 306, staggered line array 312 to registers 310 and 314, and staggered line array 320 to registers 318 and 322), one of which is shared with a line array of large photosensors. When the large photosensors are used, charge transfer registers (324, 328, and 332) transfer charge to their respective amplifiers (326, 330, 334). When the small photosensors are used, the charge transfer registers multiplex charges to the amplifiers. FIG. 3B illustrates the same configuration as FIG. 3A with the addition of lateral overflow drains (334, 336, 338, 340, 342, 344).

As discussed in conjunction with FIGS. 2A and 2B, in FIG. 2A, four charge shift register stages are used to store charge from one large photosensor area, and one charge shift register stage is used to store charge from one small photosensor area. In FIGS. 1, 3A, and 3B, note that two charge shift register stages are used to store charge from one large photosensor area, and that one charge shift register stage is used to store charge from one small photosensor area. Accordingly, in FIGS. 1, 3A, and 3B, the low resolution (large photosensor) mode can accumulate two times as much charge per pixel as the low resolution mode, and in FIG. 2A, the low resolution mode can accumulate four times as much charge per pixel as the high resolution mode, thereby improving the signal-to-noise ratio for the low resolution mode relative to the high resolution mode. Alternatively, the configuration of FIG. 2B can be used to provide a high-speed mode with a lower signal-to-noise.

There are two common approaches to providing different bands of wavelengths of light to rows of photosensors. In one approach, the light is spectrally separated by a color separator, and multiple bands of wavelengths are presented to multiple rows of photosensors simultaneously. In a second approach, color filters are used on each row of photosensors. With a color separator, all photosensor arrays simultaneously image one scanline. With color filters, separate scanlines are imaged by each row of photosensors. For example, in FIG. 1, with color filters, red row 102 images a different scanline on the document than green row 116. With color filters, for each scanline, buffer memory is required to save earlier scanned data until all colors have been scanned. Shared charge shift registers may be used to reduce the spacing between rows of photosensors, thereby reducing the amount of buffer memory. This is illustrated in FIG. 4.

In the examples provided in FIGS. 1, 2A, 2B, 3A, and 3B, photosensors of different sizes are sharing charge shift registers. Sharing of charge shift registers is also useful for identically sized photosensors, to reduce the die area on the semiconductor substrate, and to reduce the amount of buffer memory required when using color filters. In FIG. 4, there are three sets of identically sized staggered photosensors (404, 408, 416, 420, 428, and 432). Elements 400, 412, 424, and 436 are charge shift registers. Elements 406, 418, and 430 are lateral overflow drains. Elements 438, 442, and 446 are charge transfer registers. Two charge shift registers (412 and 424) are shared by rows of identically sized photosensors. In particular, charge shift register 412 is shared by photosensor rows 408 and 416, and charge shift register 424 is shared by photosensor rows 420 and 428. By sharing charge shift register 412, photosensor rows 408 and 416 can be placed physically closer together, reducing die size, and reducing buffer memory.

Figure 4:
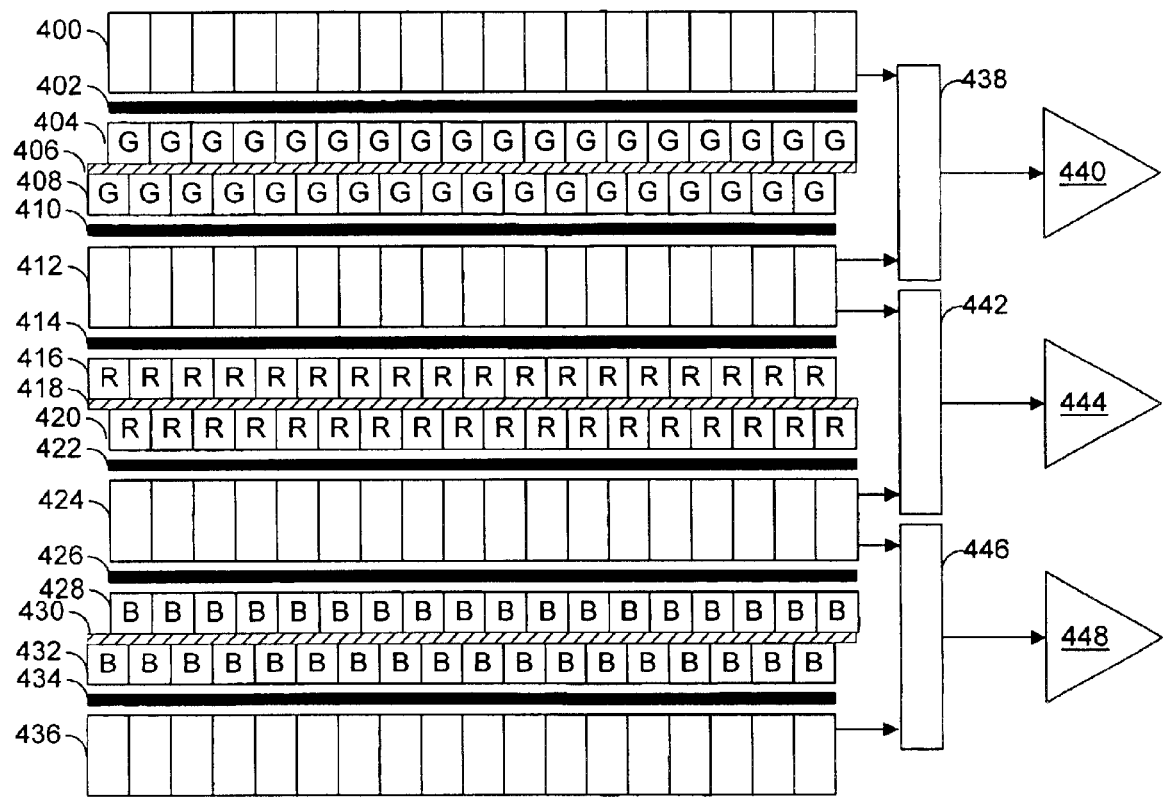
FIG. 4 is a block diagram of an alternative example embodiment having shared structures with identically sized staggered photosensor arrays.

In the configuration illustrated in FIG. 4, low resolution data may be obtained by using only row of each pair of rows of staggered photosensors. For example, a low resolution scan may be obtained by using photosensor rows 404, 416, and 428. In low resolution mode, unused charges may be drained to the lateral overflow drains. If high resolution is required, the configuration in FIG. 4 requires that some photosensor rows use shared charge shift registers and amplifiers at separate times. For example, the green photosensors 404 may first use charge shift register 400, transfer gate 438, and amplifier 440. At the same time, red photosensors 416 may use charge shift register 412, transfer gate 442, and amplifier 444. After this data has been read, green photosensors 408 may use charge shift register 412, transfer gate 438, and amplifier 440. Two identically colored rows of photosensors, for example, rows 404 and 408, may be positioned an additional one-half line apart vertically to compensate for the time offset involved in charge collection and readout.

Figure 5:
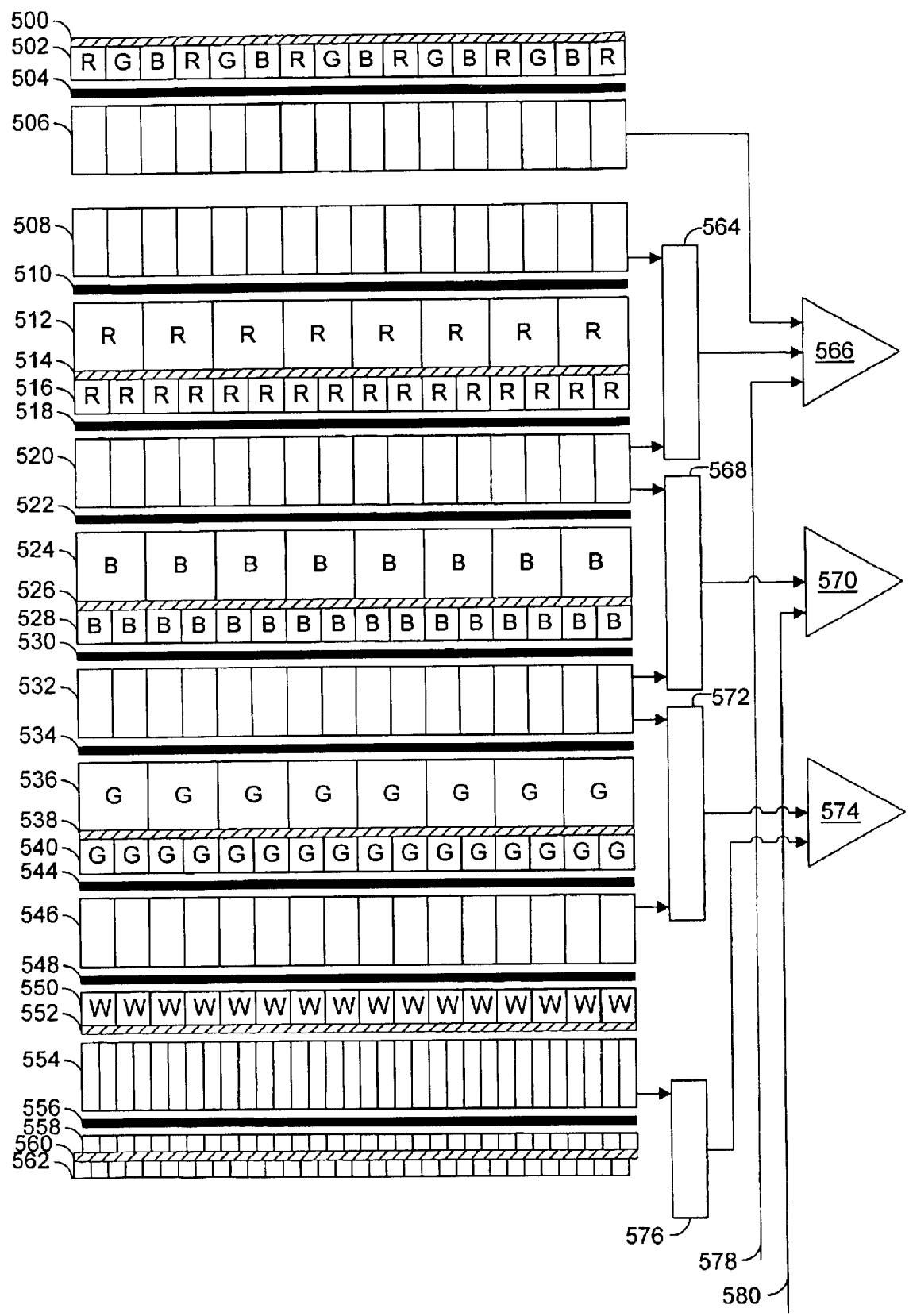
FIG. 5 is a block diagram of an alternative example embodiment having shared structures with a combination of different sized photosensor arrays and identically sized staggered photosensor arrays.

Many scanner designs require various trade-offs among speed, sampling rate, and signal-to-noise. If large photosensors are used for good signal-to-noise, then input sampling rate is low. If small photosensors are used to high input sampling rates, then signal-to-noise is reduced for low sampling rates. FIG. 5 illustrates a photosensor assembly, with still another combination of photosensors of different sizes with shared structures, that greatly reduces the tradeoffs required among speed, sampling rate, and signal-to-noise.

To provide a useful scale for illustration, part of the overall assembly depicted in FIG. 5 is not illustrated. The bottom part of the assembly of FIG. 5 is essentially identical to FIG. 4, except for the connection of amplifiers. In particular, in FIG. 5, photosensor rows 558 and 562 correspond to the green photosensor rows 404 and 408 in FIG. 4. The additional red and blue staggered rows, as illustrated by rows 416, 420, 428, and 432 in FIG. 4, are not illustrated in FIG. 5. In the overall assembly depicted in FIG. 5, including the parts that are not illustrated, there are red, green, and blue rows of photosensors having three different input sampling rates. There is a row of white photosensors for gray scale and binary scanning. There is also a row of photosensors for monitoring the color of the source of illumination.

In FIG. 5, elements 500, 514, 526, 538, 552, and 560 are lateral overflow drains. Elements 502, 512, 516, 524, 528, 536, 540, 550, 558, and 562 are rows of photosensors. Elements 504, 510, 518, 522, 530, 534, 544, 548, and 556 are charge transfer gates. Elements 506, 508, 520, 532, 546, and 554 are charge shift registers. Elements 564, 568, 572, and 576 are charge transfer gates. Elements 566, 570, and 574 are amplifiers.

Photosensor row 502 is useful for monitoring the color of the source of illumination. This is the subject of a separate application, and for purposes of the present invention, it is simply one additional row of photosensors. If used for detecting lamp color, photosensor row 502 may have to be physically far from the other photosensors, because of the location of a calibration strip being sensed relative to the location of the scanlines. Accordingly, photosensor row 502 as illustrated may not share a charge shift register, and in fact may actually be on a separate substrate, but may still share an amplifier.

Photosensor row 550 senses white light. This useful for scanning text for optical-character-recognition, for gray-scale scanning, and for black and white copying.

In FIG. 5, some charge shift registers are shared by photosensors having different sizes and sensing different colors. For example, charge shift register 520 is shared by large photosensors 524 sensing blue, and by smaller photosensors 516 sensing red. By proper switching of the charge transfer gates, amplifier 566 provides red data (at one of three input sampling rates), or lamp color data. Amplifier 570 provides blue data (at one of three input sampling rates). Amplifier 574 provides green data (at one of three input sampling rates), or white data. The assembly may, for example, provide data having input sampling rates of 300 pixels per inch, 600 pixels per inch, and 1,200 pixels per inch. In addition, 2,400 pixel per inch data may be provided by staggered rows having 1,200 pixels per inch for each row, as discussed in conjunction in FIG. 4.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A photosensor assembly comprising:
   a first array of photosensor elements, each photosensor element in the first array having a first size;
   a second array of photosensor elements, each photosensor element in the second array having a second size, wherein the first size and second size are substantially different;
   a charge shift register; and
   both the first and second arrays of photosensor elements adapted to transfer charges to the charge shift register,
   at least one of the arrays of photosensor elements being arranged as first and second line arrays, on each side of a centerline, in a staggered pattern, such that a first photosensor in the first line array is offset in the direction of the centerline relative to a first photosensor in the second line array.

2. The photosensor assembly of claim 1, further comprising:
   a third array of photosensor elements;
   an overflow drain; and
   the third array, and one of the first and second arrays, adapted to transfer overflow charges to the overflow drain.

3. The photosensor assembly of claim 1, further comprising:
   an overflow drain, the first and second line arrays sharing the overflow drain.

4. The photosensor assembly of claim 1, further comprising:
   first and second amplifiers;
   wherein the charge shift register shifts charges from the first array of photosensor elements to the first amplifier or the charge shift register shifts charges from the second array of photosensor elements to the second amplifier.

5. The photosensor assembly of claim 4, wherein the first and second amplifiers have substantially different gains.

6. A photosensor assembly, comprising:
   a first array of photosensor elements, each photosensor element in the first array having a first size;
   a second array of photosensor elements, each photosensor element in the second array having a second size, wherein the first size and second size are different;
   an overflow drain;
   the first and second arrays of photosensor elements adapted to transfer overflow charges to the overflow drain; and
   at least one of the arrays of photosensor elements being arranged as first and second line arrays, on each side of a centerline, in a staggered pattern, such that a first photosensor in the first line array is offset in the direction of the centerline relative to a first photosensor in the second line array.

7. A photosensor assembly, comprising:
   a first array of photosensors, arranged as first and second line arrays, on each side of a centerline, in a staggered pattern, such that a first photosensor in the first line array is offset in the direction of the centerline relative to a first photosensor in the second line array;
   a second array of photosensors, arranged as third and fourth line arrays, on each side of a second centerline, in a staggered pattern, such that a first photosensor in the third line array is offset in the direction of the second centerline relative to a first photosensor in the fourth line array; and the charge shift register receiving charges from the second line array and from the third line array.

8. A method of scanning, comprising:

providing a first array of photosensors, arranged as first and second line arrays, on each side of a centerline, in a staggered pattern, such that a first photosensor in the first line array is offset in the direction of the centerline relative to a first photosensor in the second line array;

exposing the first array of photosensors to light;

exposing a second array of photosensors to light;

transferring charges from the first array of photosensors, to a charge shift register, for a first optical sampling rate; and transferring charges from the second array of photosensors, to the charge shift register, for a second optical sampling rate.

* * * * *